United States Patent [19]
Charron

[11] Patent Number: 5,735,307
[45] Date of Patent: Apr. 7, 1998

[54] VALVE INTERCHANGEABLE BETWEEN ANGLE AND STRAIGHT

[75] Inventor: Charles S. Charron, Oakville, Canada

[73] Assignee: Dahl Brothers Canada Limited, Mississauga, Canada

[21] Appl. No.: 607,818

[22] Filed: Feb. 27, 1996

[51] Int. Cl.$^6$ ....................... F16K 5/06
[52] U.S. Cl. ............... 137/270; 251/315.01; 251/288
[58] Field of Search .................. 137/269, 270; 251/288, 286, 315.01, 315.16

[56] References Cited

U.S. PATENT DOCUMENTS

| | | | |
|---|---|---|---|
| 670,083 | 3/1901 | Osborne . | |
| 741,267 | 10/1903 | Neubling . | |
| 1,618,349 | 2/1927 | Olsen | 137/270 |
| 3,107,546 | 10/1963 | Rowland | 251/288 X |
| 3,516,638 | 6/1970 | Piggott . | |
| 3,943,962 | 3/1976 | Nagy . | |
| 4,476,891 | 10/1984 | Mulas et al. . | |
| 4,936,545 | 6/1990 | Ferrero | 251/288 |
| 5,232,200 | 8/1993 | Combeau | 251/315.01 |

FOREIGN PATENT DOCUMENTS 2552842  4/1985  France ................ 137/270

OTHER PUBLICATIONS

Dahl Brothers Canada Limited brochure "Design your Own Valve with Dahl's Mini-Wheel," Dec. 1992.

*Primary Examiner*—Kevin Lee
*Attorney, Agent, or Firm*—Hodgson, Russ, Andrews Woods & Goodyear LLP

[57] ABSTRACT

A combination of parts including a single piece valve body for a valve which is interchangeable between a straight valve and an angle valve. Each of the three bores of the valve body is adapted to operatively receive the valve opening and closing mechanism, the other two bores receiving fittings for attaching the flow conduits. One of the bores is perpendicular to the other two bores. If the opening and closing mechanism is received in this bore, the assembly comprises a straight valve. If the opening and closing mechanism is received in one of the other bores, the assembly comprises an angle valve. The three faces of the valve body through which the bores extend are machined substantially identically and symmetrically to the center thereof which is the point of intersection of the axes of the bores so that each bore is able to accommodate interchangeably the valve opening and closing mechanism and the fittings.

14 Claims, 7 Drawing Sheets

5,735,307

VALVE INTERCHANGEABLE BETWEEN ANGLE AND STRAIGHT

The present invention relates generally to valves examples of which are shown in U.S. Pat. Nos. 670,083; 741,267; 3,516,638; 3,943,962; and 4,476,891.

A valve body normally has an inlet and an outlet to which fittings are connected for connecting the valve to fluid conduits. The valve provides means for shutting off flow through the conduits and for allowing such flow. In a straight valve, the inlet and outlet bores are co-axial. The axes of the inlet and outlet bores of an angle valve are perpendicular to each other to accommodate a change of direction of the conduit.

Valves have been provided which utilize a ball with a channel therethrough and disposed in the flow space between the inlet and outlet bores. For a straight valve, the flow channel outlets are at 180 degrees, i.e., on opposite sides of the ball. For an angle valve, the flow channel outlets are at 90 degrees. The valve is opened and closed by turning the ball through 90 degrees. When the ball is oriented so that the channel outlets are aligned with (are in flow communication with) the inlet and outlet bores, flow is allowed through the valve, and the valve is said to be turned on. When the ball is turned through 90 degrees so that the channel is not in flow communication with one or both of the inlet and outlet bores, flow through the valve is blocked, and the valve is said to be turned off.

U.S. Pat. No. 3,516,638 to Piggott discloses an angle valve having such a ball wherein the ball has a T-shaped passage providing a flow channel, one of the passage outlets being in flow communication with a complex structure for supplying pressure from the flow medium against the ball to provide increased sealing.

Valves have also been provided wherein the balls are non-spherical, i.e., they have major and minor diameters so that, when the ball is rotated to close the valve, a surface (for the angle valve) or surfaces (for the straight valve) along a major diameter press more tightly against the respective seal or seals to compress them to achieve tighter sealing.

It is considered desirable to provide a valve which is interchangeable between a straight and an angle valve, i.e., wherein the same parts may be assembled into either a straight valve or an angle valve. This would reduce the number of different parts which must be maintained in inventory and allow economies of scale since all machines, jigs, and fixtures for assembly, test, and packaging can be made to fit one body configuration. This would thus allow easier automation of manufacturing operations, and the use of large quantities of a single kind of valve would allow better quality control and less risk of manufacturing errors.

U.S. Pat. No. 4,476,891 to Mulas et al discloses a valve which can be assembled as either a straight valve or an angle valve. The valve body is divided into two halves by a plane inclined at 45 degrees to the axis of the spindle such that the two halves can be assembled either with the axes of the pipe connection sleeves aligned (for a straight valve) or at a 90-degree orientation (for an angle valve). One of the body halves has an opening for an obturator spindle to extend therethrough. The obturator has a T-shaped passage, and seals are provided at interfaces of the obturator and valve body passages.

The two-piece body of the Mulas et al valve adds complexities to the assembly process and may result in leakage if the interface between the two pieces is not adequately sealed. Further, there may be misalignment problems in assembly of the Mulas et al valve due to poor fitting of the body parts to each other.

Accordingly, it is an object of the present invention to provide a reliable and easy-to-assemble valve assembly which is interchangeable between a straight valve and an angle valve.

In order to provide such a reliable and easy-to-assemble valve assembly, in accordance with the present invention, each of the three bores of the valve body is adapted to operatively receive the valve opening and closing means, the other two bores receiving fittings for attaching the flow conduits. One of the bores is perpendicular to the other two bores. If the opening and closing means is received in this bore, the assembly comprises a straight valve. If the opening and closing means is received in one of the other bores, the assembly comprises an angle valve.

The above and other objects, features, and advantages of the present invention will be apparent in the following detailed description of the preferred embodiment thereof when read in conjunction with the accompanying drawings wherein the same reference numerals denote the same or similar parts throughout the several views.

DETAILED DESCRIPTION OF THE PREFERRED EMBODIMENT

Figure 1:
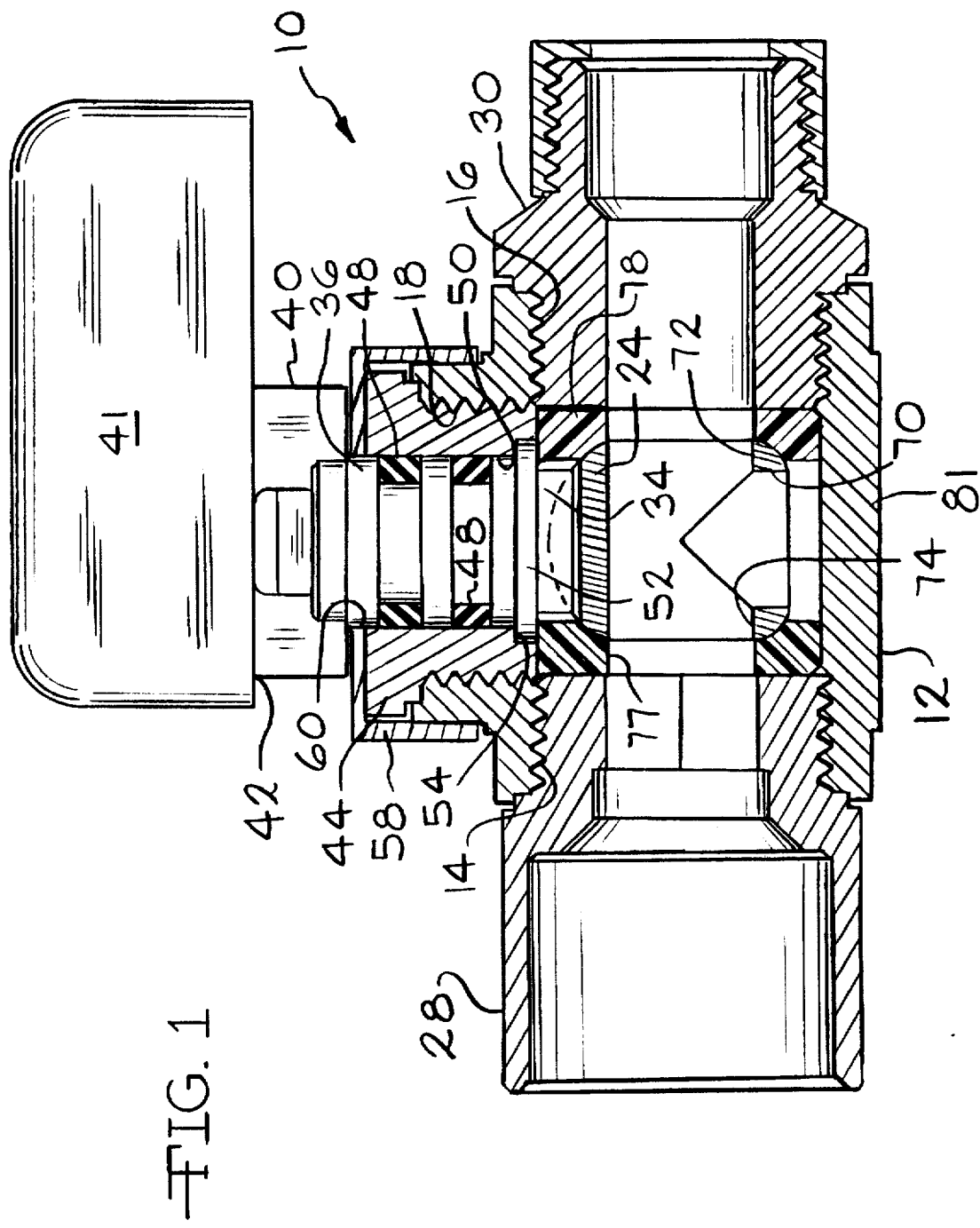
FIG. 1 is a sectional view, with parts not sectioned, of a valve which embodies the present invention, assembled as a straight valve and shown open to the flow of fluid therethrough.
Figure 2:
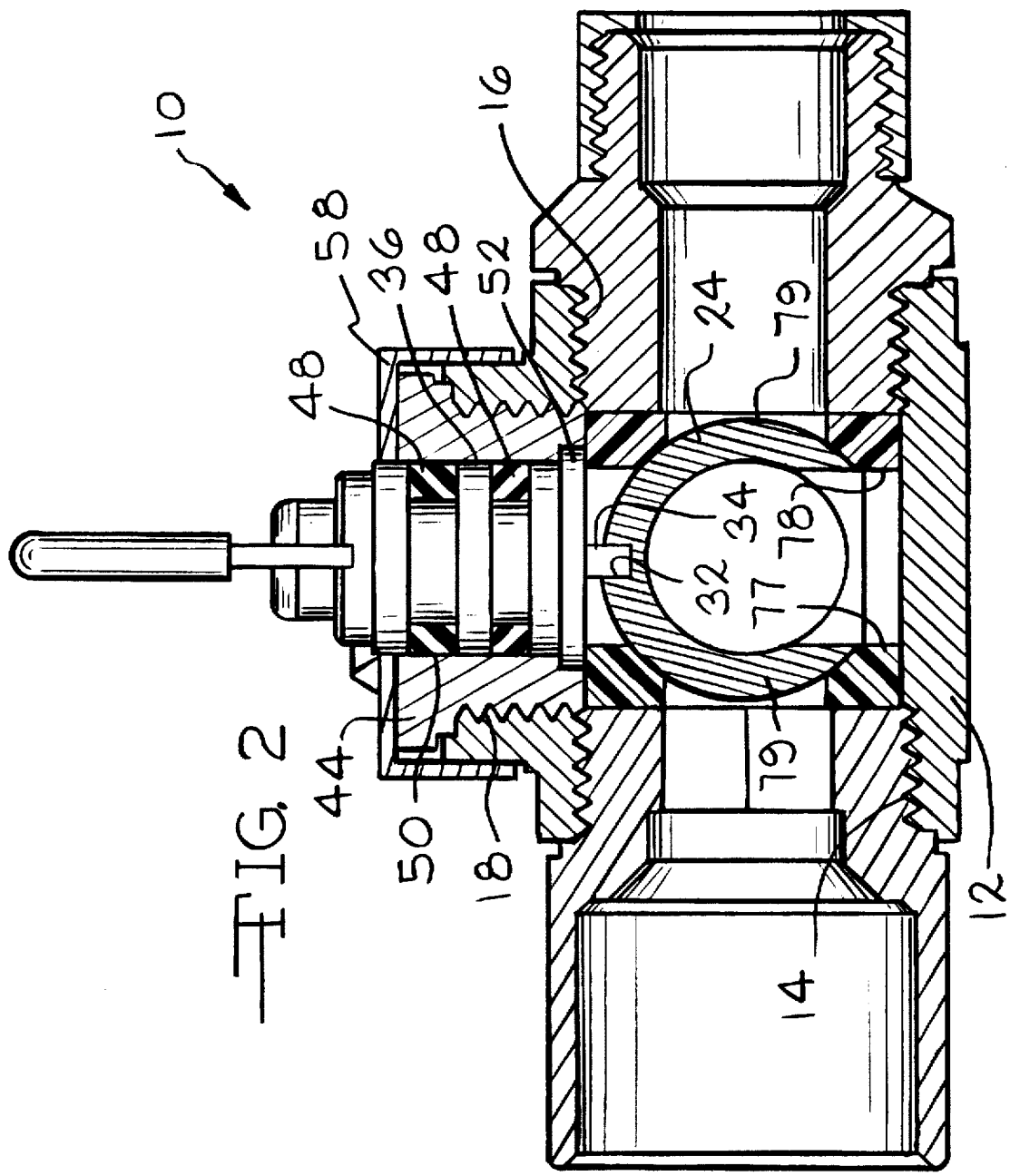
FIG. 2 is a view thereof similar to that of FIG. 1 and shown closed to the flow of fluid therethrough.
Figure 3:
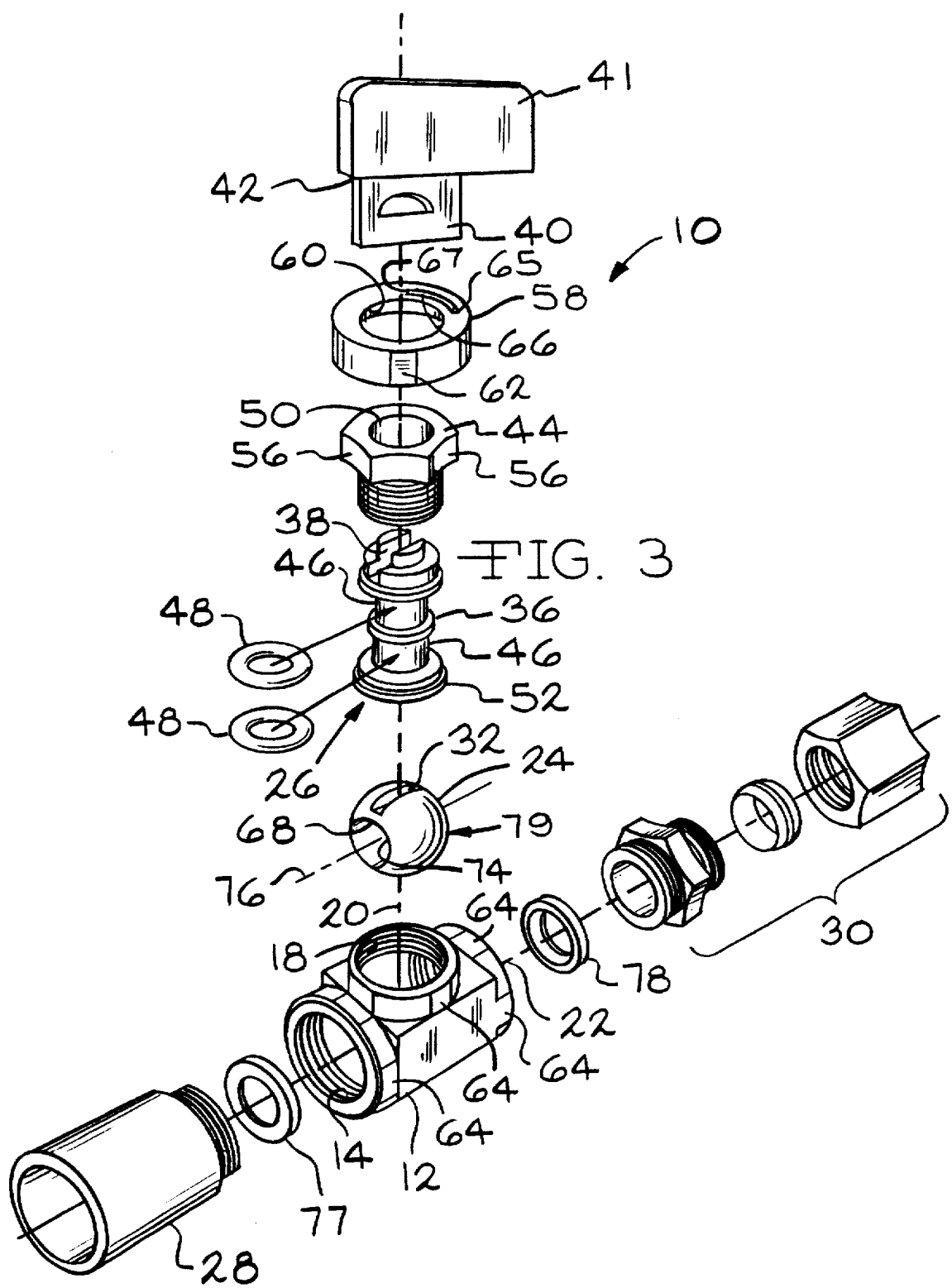
FIG. 3 is an exploded view thereof and shown open to the flow of fluid therethrough. When assembled with the handle positioned as shown.
Figure 4:
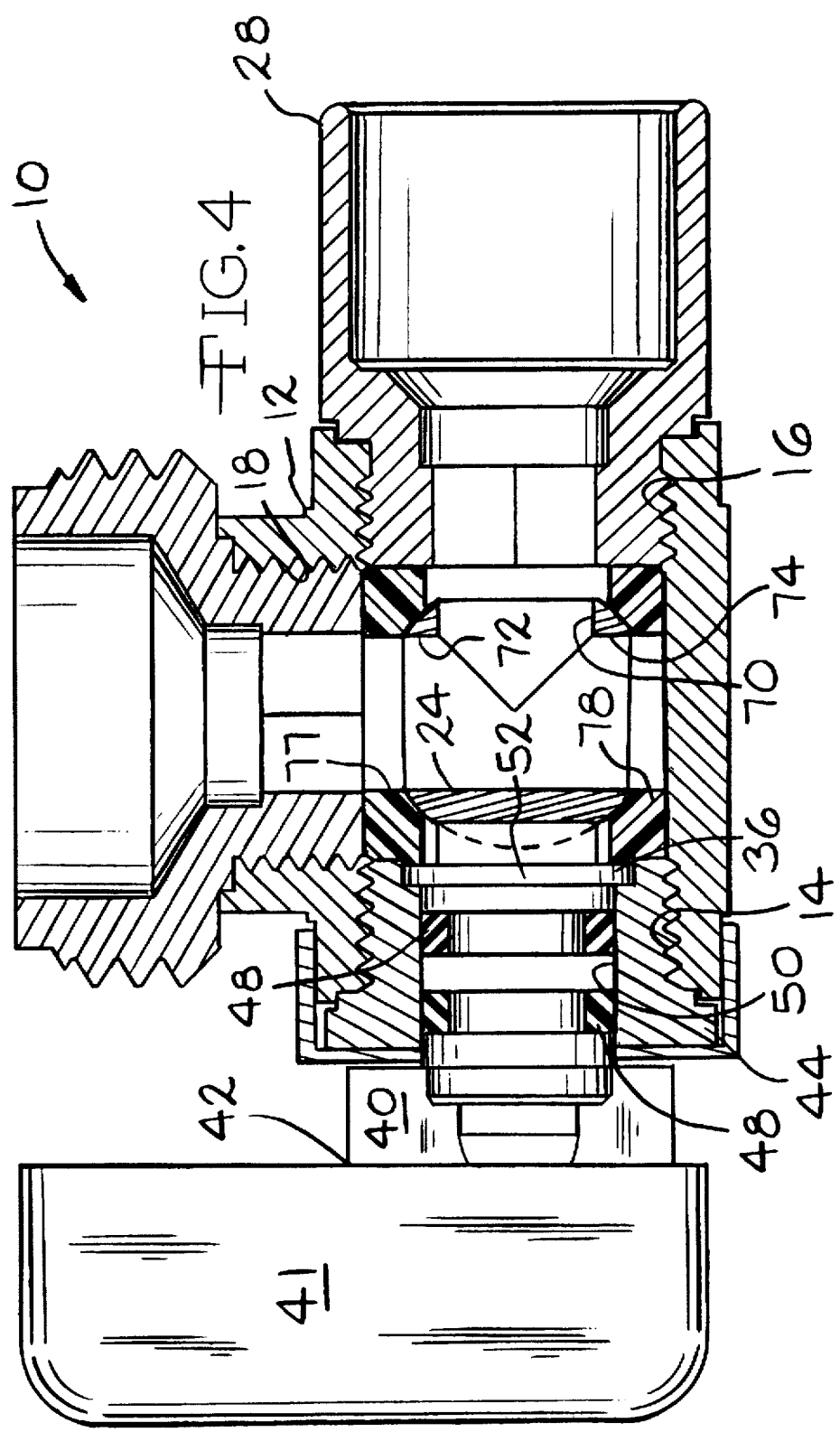
FIG. 4 is a view similar to that of FIG. 1 of the valve assembled as an angle valve and shown open to the flow of fluid therethrough.
Figure 5:
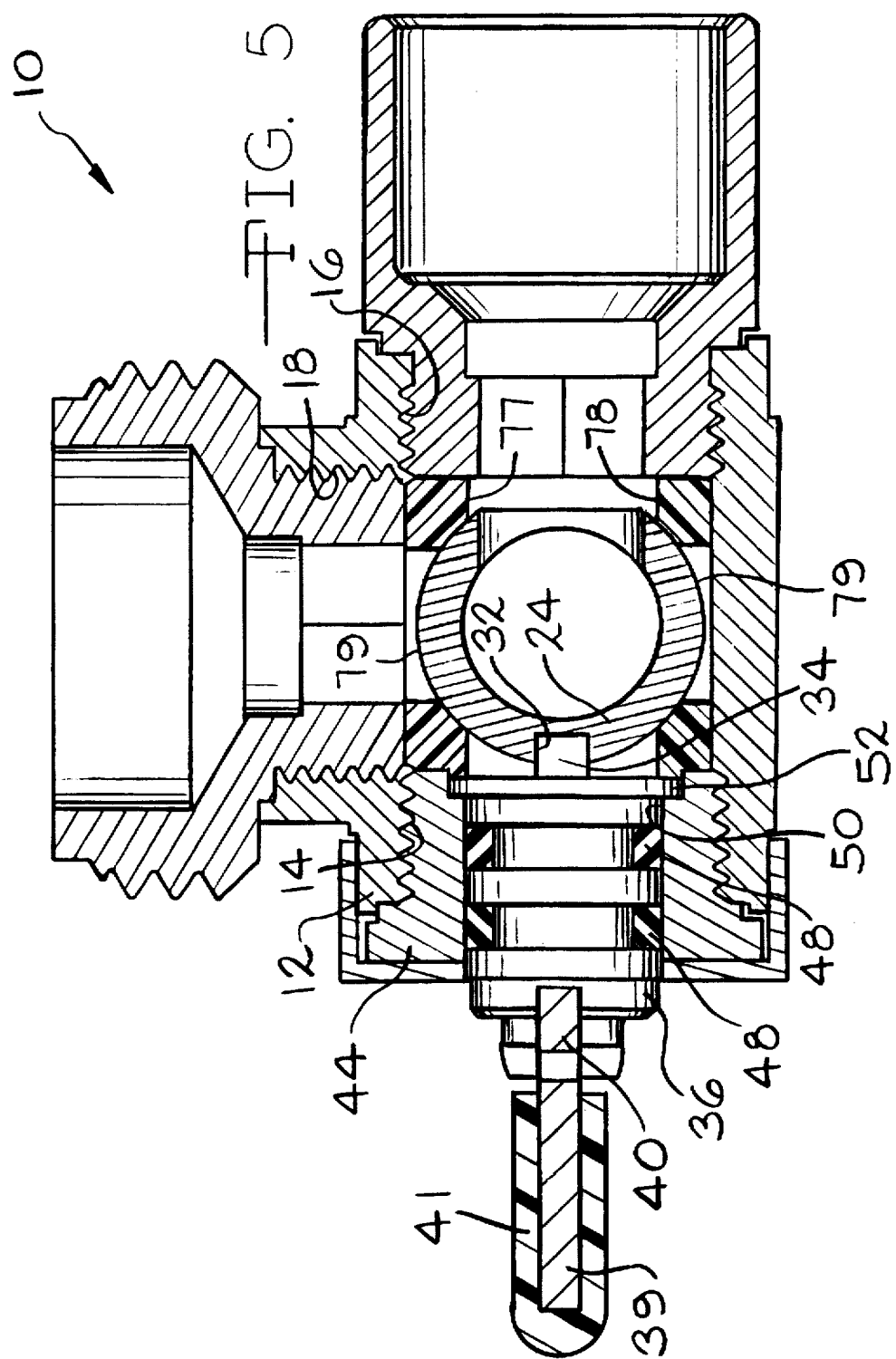
FIG. 5 is a view similar to that of FIG. 1 of the valve assembly of FIG. 4 shown closed to the flow of fluid therethrough.
Figure 6:
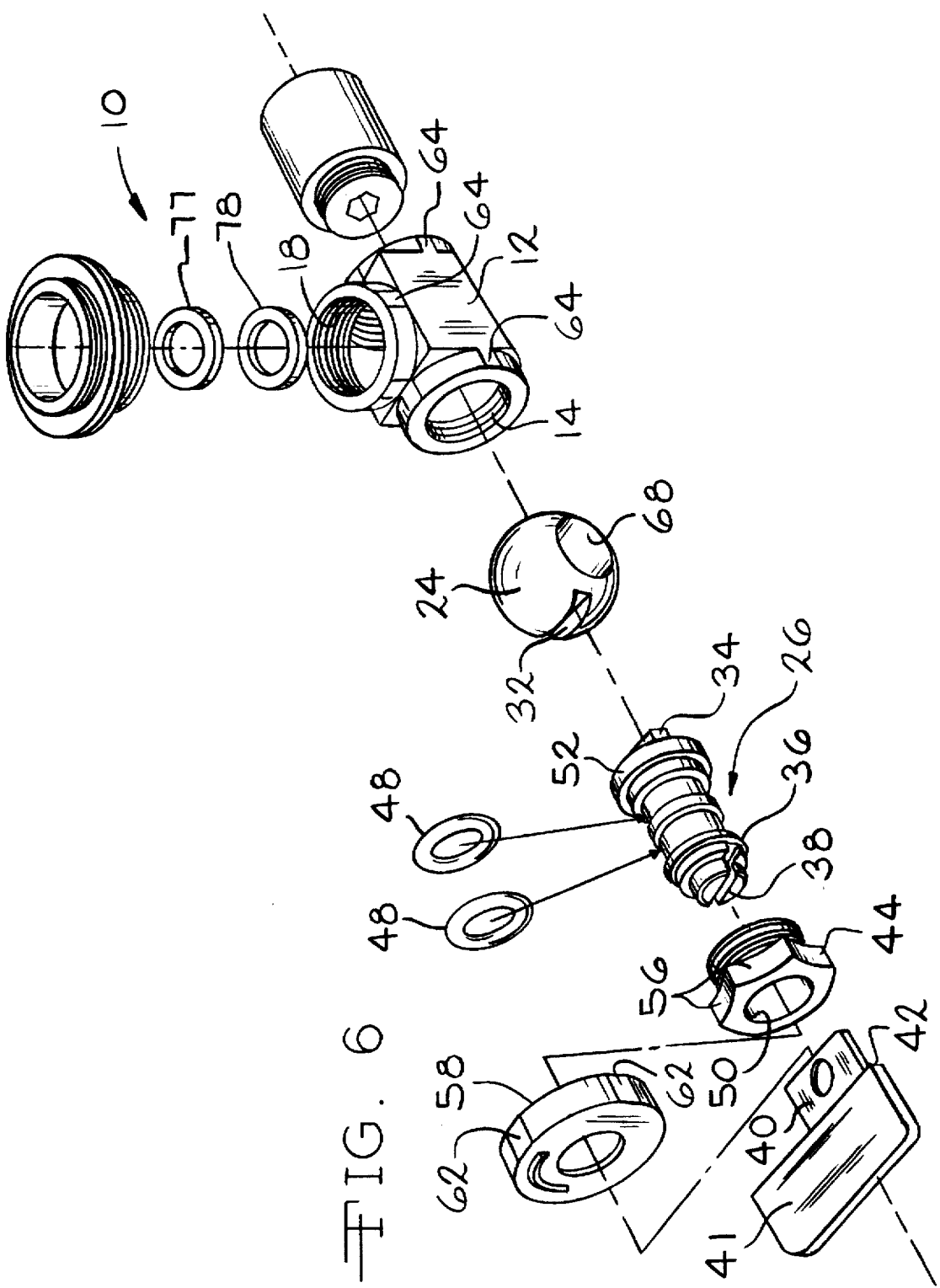
FIG. 6 is a view similar to that of FIG. 3 of the valve assembly of FIG. 4 shown closed to the flow of fluid therethrough, when assembled with the handle positioned as shown.

Referring to the drawings, there is shown generally at 10 a valve assembly, composed of bronze or other suitable material, assembled as a straight valve in FIGS. 1, 2, and 3 and assembled as an angle valve in FIGS. 4, 5, and 6.

The assembly 10 comprises a single piece valve body 12 which has first, second, and third internally-threaded bores 14, 16, and 18 respectively, bores 14 and 16 being co-axial, and the axis 20 of bore 18 being perpendicular to the common axis 22 of bores 14 and 16. Before the valve is assembled, all of the bores 14, 16, and 18 are in flow communication with each other.

Illustrated at 24 is a ball disposable within the body 12 and rotatable by a spindle assembly, illustrated at 26, for opening and closing the valve, as hereinafter discussed.

The three faces of the valve body 12 through which the bores extend are preferably machined identically and symmetrically to the center thereof, i.e., the point of intersection of the axes 20 and 22 so that each bore 14, 16, or 18 is able optionally to accommodate the spindle assembly or to accommodate end connectors or fittings, illustrated at 28 and 30 for bores 14 and 16 respectively in FIG. 3, for attachment of end portions of fluid flow conduits (not shown). The end connectors 28 and 30 which are shown are merely representative, it being understood that end connectors are made in a great variety of configurations for installation with metal or plastic pipe. Valves which embody the present invention may be configured to accommodate any suitable end connectors. If the spindle assembly 26 is operatively received in the perpendicular bore 18, as shown in FIG. 1, 2, and 3, the conduits would be attached to the aligned or co-axial bores 14 and 16 in which case the assembled valve may be called a straight valve. If the spindle assembly 26 is operatively received in one of the co-axial bores such as bore 14, as shown in FIGS. 4, 5, and 6, the conduits would be attached to the other co-axial bore 16 and the perpendicular bore 18 in which case the assembled valve may be called an angle valve, i.e., the conduit sections would extend at 90 degrees to each other.

The ball 24 is sized to be received within the valve body 12 with the bores 14, 16, and 18 generally extending closely thereto. The ball 24 has an elongate notch, illustrated at 32, in its surface, the notch having a generally flat bottom. The notch snugly receives a mating projection 34 on one end of a spindle 36 whereby rotation of the spindle effects rotation of the ball 24. The other end of the spindle 36 has an elongate notch, illustrated at 38, across its surface in which is snugly received an appending portion 40 of a handle 42. The gripping portion 39 (FIG. 5) of the handle 42 may desirably be suitably covered with a plastic material, illustrated at 41, or the like.

The central portion of the spindle 36 is received in a bushing 44, which is sized to be screwed into the respective valve body bore (18 in FIG. 3), for rotation within the bushing bore, illustrated at 50, as the handle 42 is turned. The central portion of the spindle 36 has a pair of spaced grooves 46 in which are received o-rings 48 for sealingly engaging the bushing 44 for rotation within the bushing bore 50.

Adjacent the projection 34, the spindle 36 has an increased diameter portion 52 which engages a shoulder 54 in the respective end of bushing bore 50 so as to limit axial movement of the spindle 36 in a direction away from the ball 24 thereby to precisely locate the spindle relative to the ball. The spindle portion 52 is desirably sized to be flush with the respective end of the bushing, and the spindle length is desirably such that the bottom of the notch 38 is slightly elevated from the respective bushing end surface.

The upper portion of the bushing 44 is hexagonal or otherwise suitably shaped, having lands 56 for application of a wrench.

A thin generally circular cap 58 is press-fit over the bushing 44 and has a central hole, illustrated at 60, through which the spindle 36 extends. The cap 58 has four equally spaced lands 62 and is sized to press-fit tightly over the bushing. The lands 62 are provided to align with similar lands 64 on the valve body 12 in order to locate the cap position circumferentially. The bottom of the spindle notch 38 is generally flush (or slightly raised) with the upper surface of the cap 58. A projection 66 from the upper surface of the cap extends circumferentially of the cap over about 90 degrees from a point corresponding to the center of one land 62 to a point corresponding to the center of an adjacent land 62 so as to act as a stop for the handle portion 40 to thereby limit movement of the handle 42 to 90 degrees. For example, the assembly may be constructed so that, when the handle portion 39 is aligned with the axis 22, as shown in FIG. 1, the valve is open, and, when the handle portion 39 is cross-wise to the axis 22, as shown in FIG. 2, the valve is closed.

The ball 24 has a T-bore, illustrated at 68, extending therethrough for passage of fluid, i.e., the T-bore 68 has three outlets 70, 72, and 74. Outlet 70 is diametrically opposite the slot 32 and thus is closed to fluid flow when the assembly is assembled as a straight valve, as shown in FIGS. 1, 2, and 3. Outlets 72 and 74 are co-axial, the axis 20 of outlet 70 being perpendicular to the common axis, illustrated at 76, of outlets 72 and 74. When the assembly is assembled as a straight valve, the ball 24 is rotatable to a position, as shown in FIGS. 1 and 3, wherein the outlets 72 and 74 align with valve body bores 16 and 14 (axes 22 and 76 being substantially the same) for flow communication between the conduits to which bores 14 and 16 are attached, i.e., the valve is open, the handle member 40 engaging one end 65 of projection 66. By turning the handle 42 through 90 degrees until the handle member 40 engages the other end 67 of projection 66 and is thus "stopped", the ball 24 is rotated 90 degrees so that the axis 76 is perpendicular to axis 22, the outlets 72 and 74 are out of alignment with and no longer in fluid communication with bores 16 and 14. Instead, ball wall portions, illustrated at 79, face and block the bores 14 and 16 respectively to prevent fluid flow from the conduits through the valve, i.e., the valve is closed.

In order to seal the interfaces between the bore portions 14 and 16 and the ball 24 when the assembly is assembled as a straight valve, suitable annular seals 77 and 78, composed of Teflon material or other suitable material, are suitably seated at the inward ends of the bores 14 and 16 respectively.

When the assembly is assembled as an angle valve with the spindle assembly 26 received in bore 14, one of the annular seals 77 is seated at the inner end of bore 18. The other annular seal 78 is suitably seated on the bottom wall 81 of the housing 12 (opposite the bore 18) to suitably support the ball 24. When thusly assembled, outlet 70 of the ball remains in flow communication with the bore 16 when the ball is turned. When the angle valve is in the open position, one of the co-axial outlets (72 in FIG. 4) is aligned with the bore 18 for fluid communication therewith. When the angle valve is in the closed position after the ball is turned 90 degrees, neither of the co-axial outlets 72 or 74 is in fluid communication with the bore 18, and, instead, the bore 18 is closed or blocked to fluid flow by one of the ball surfaces 79.

Figure 7:
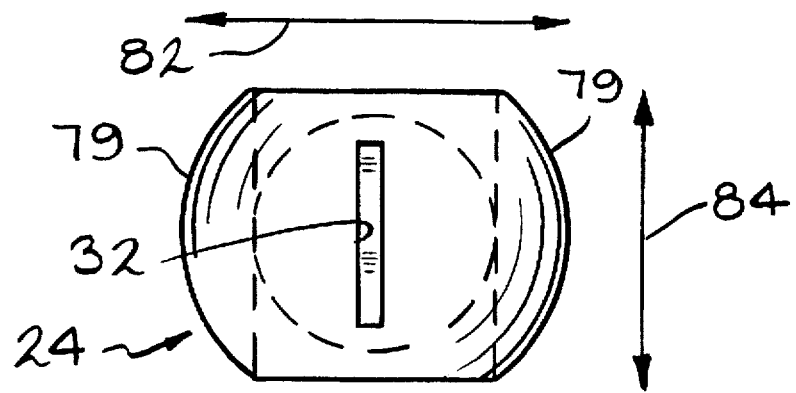
FIG. 7 is a top view of a ball for the valve assembly.
Figure 8:
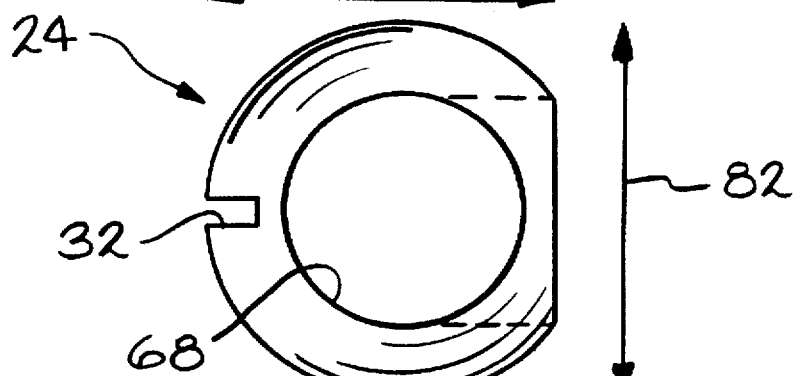
FIG. 8 is a side view of the ball.

The term "ball", as used in this specification and the claims, is not limited to a spherical shape. Preferably, the ball 24 is non-spherical, i.e., it approaches a spherical shape but has a major diameter and a minor diameter, illustrated at 82 and 84 respectively in FIG. 7, which may, for example, be about $^{17}/_{32}$ inch and $^7/_{16}$ inch respectively. Major diameter 82 extends between ball wall surfaces 79, which are substantially equally distant from the ball center, to provide increased sealing pressure against the annular seals 77 and 78 when the valve is in the closed position. Each of the ball outlets is desirably substantially equally distant from the ball center. Minor diameter 84 extends parallel to axis 76. Ball 24 preferably has a second minor diameter, illustrated at 86 in FIG. 8, which may be greater than minor diameter 84, for example, about ½ inch. Minor diameter 86 extends parallel to axis 20.

By providing a combination of parts which may be assembled either as a straight valve or as an angle valve, as provided by the present invention, the number of different parts which must be maintained in inventory is desirably reduced, and manufacturing economies are introduced since all machines, jigs, and fixtures for assembly, test, and packaging can be made to fit one body configuration. This would thus allow easier automation of manufacturing operations, and the use of large quantities of a single kind of valve would allow quality control and less risk of manufacturing errors. The one-piece construction of the valve body is provided to achieve a more reliable valve free of misalignment problems and free of problems of leakage between valve body parts.

Figure 9:
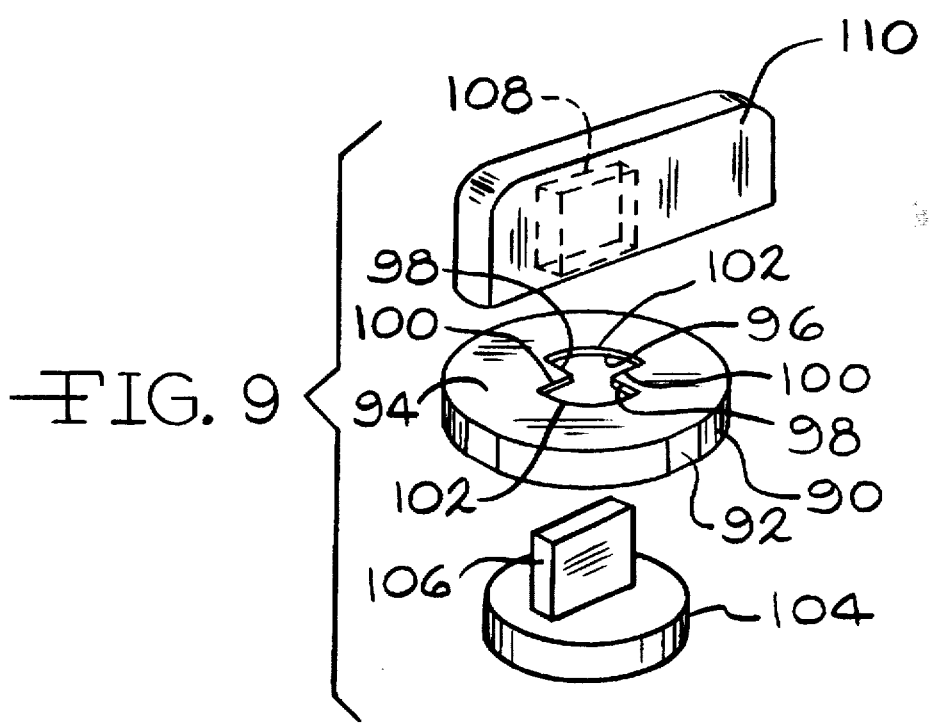
FIG. 9 is an exploded view of a portion of a valve assembly, illustrating an alternative means for attaching the handle.

Referring to FIG. 9, there is illustrated an alternative embodiment of the handle for the assembly. In accordance with this embodiment, there is illustrated at 90 a cap which, except as described hereinafter, is similar to cap 58 and similarly has lands 92 spaced at 90 degrees about its periphery for alignment thereof with the valve body 12. Instead of a circular hole, cap 90 has centrally positioned in its upper wall 94 a hole, illustrated at 96, which has a first pair of parallel edges 98 on opposite halves of the upper wall 94. A second pair of parallel edges 100 extend outwardly (toward the periphery) in opposite directions from inner ends respectively of edges 98 and at right angles thereto. Curved edges 102 (which may be concentric with the cap periphery) extend between the outer ends of edges 98 and the corresponding outer ends of edges 100. The hole 96 may thus be characterized as having the shape of a bowtie with the narrow portion thereof at the center of the cap.

There is further illustrated at 104 a spindle which is similar to spindle 36 except that it has a narrow rectangular-shaped projection 106 from its upper surface. The hole 96 is sized to receive the projection 106 therein so that the projection 106 can turn 90 degrees between a first position wherein the projection abuts or is stopped by parallel edges 98 and a second position wherein the projection abuts or is stopped by parallel edges 100. The spacing between the parallel edges 98 and between the parallel edges 100 is equal to slightly more than the thickness of the projection 106, and the distance diametrically between the curved edges 102 is equal to slightly more than the length of the projection 106. Thus, the edges 98 and 100 act as stops to limit rotational movement of the projection 106 to 90 degrees.

After passage through the hole 96 of stop cap 90, the projection 106 is snugly received in a mating narrow rectangular-shaped pocket or recess, illustrated at 108, in a handle 110, which may be cast zinc or otherwise suitably composed. The pocket 108 is desirably sized to allow the handle 110 to "snap" onto the projection 106 thereby connecting the handle to the spindle 104 for turning thereof within the stop cap hole 96 through a maximum angle of 90 degrees between open and closed positions of the valve.

It should be understood that, while the invention has been described in detail herein, the invention can be embodied otherwise without departing from the principles thereof. For example, the assembly may have other suitable means for attaching the spindle to the handle or to the ball or to the valve body. For another example, other suitable means may be provided for opening and closing the valve. For yet another example, the valve body may be shaped so that the annular seal 78 must be replaced by a smaller size seal when the assembly is assembled as an angle valve. Such other embodiments are meant to come within the scope of the present invention as defined by the appended claims.

What is claimed is:

1. A valve comprising a body having three faces and means for opening and closing the valve, said valve body having three bore means in corresponding ones of said three faces which are interconnected with each other to allow fluid passage between any two of said bore means, each of said bore means being adapted to operatively receive said valve opening and closing means, two of said bore means being coaxial and having a common axis and a third one of said bore means having an axis disposed substantially perpendicular to said common axis, and said three faces of said valve body being machined substantially identically and substantially symmetrically to a point of intersection of said common axis of said two of said bore means and said axis of said third one of said bore means so that each of said three bore means is able to accommodate interchangeably said means for opening and closing said valve.

2. A valve according to claim 1 wherein said valve opening and closing means comprises a ball having means defining a T-bore, a handle, means for engaging said handle to said ball for rotating said ball between a position in which the T-bore is in flow communication with each of a pair of bore means in which said valve opening and closing means is not received for passage of fluid through the valve and a position in which the T-bore is not in flow communication with one of the pair of bore means for closing the valve.

3. A valve according to claim 2 further comprising means for sealing at least one of interfaces between said ball and the pair of bore means, and said ball being characterized by being non-spherical so as to compress said sealing means along a major axis of said ball when the valve is closed.

4. A valve according to claim 1 wherein said valve body is a single piece body.

5. A valve according to claim 1 wherein said valve opening and closing means comprises a bushing adapted to be sealingly received in any of said bore means, a ball receivable within said valve body and adapted to rotate through about 90 degrees for opening and closing the valve, a spindle, means for attaching a lower portion of said spindle to said ball for rotation thereof, means for sealingly receiving said spindle in said bushing for rotation therein, a handle, and means for attaching said handle to said spindle for rotation of said spindle which is limited to about 90 degrees.

6. A combination of parts which are interchangeable between a straight valve and an angle valve, the combination comprising a valve body having first, second and third faces and including first and second bore means in said first and second faces, respectively, and in fluid communication with each other and having a common axis and further including a third bore means in said third face of said valve body and in fluid communication with said first and second bore means and having an axis which is perpendicular to said common axis, means comprising a ball disposable at the intersection of said common and said third bore axes and handle means for rotating said ball for opening and closing the valve, each of said first, second, and third bore means adapted to receive said valve opening and closing means whereby to provide fluid passage between the other two bore means when the valve is open, said first, second and third faces of said valve body being machined substantially identically and substantially symmetrically to a point of intersection of said common axis and said axis perpendicular to said common axis so that each of said first, second and third bore means is able to accommodate interchangeably said valve opening and closing means.

7. A combination according to claim 6 wherein said ball has means defining a first channel extending entirely through said ball for providing fluid passage between said first and second bore means when said first channel is aligned therewith and defining a second channel in fluid communication with said first channel and having an axis which is perpendicular to an axis of said first channel for providing fluid passage between said third bore means and one of said first and second bore means when said second and first channel means are aligned respectively therewith.

8. A combination according to claim 6 further comprising means for sealing at least one of interfaces between said ball and said bore means, and said ball being characterized by being non-spherical so as to compress said sealing means along a major axis of said ball when the valve is closed.

9. A combination according to claim 6 wherein said valve body is a single piece body.

10. A combination according to claim 6 where said valve opening and closing means comprises a bushing adapted to be sealingly received in any of said bore means, said ball adapted to rotate through about 90 degrees for opening and closing the valve, a spindle, means for attaching a lower portion of said spindle to said ball for rotation thereof, means for sealingly receiving said spindle in said bushing for rotation therein, a handle, and means for attaching said handle to said spindle for rotation of said spindle which is limited to about 90 degrees.

11. A valve comprising a body and means for opening and closing the valve, said valve body having three bore means which are interconnected with each other to allow fluid passage between any two of said bore means, each of said bore means being adapted to operatively receive said valve opening and closing means, said valve opening and closing means comprising a bushing adapted to be sealingly received in any of said bore means, a ball receivable within said valve body and adapted to rotate through about 90 degrees for opening and closing the valve, a spindle, means for attaching a lower portion of said spindle to said ball for rotation thereof, means for sealingly receiving said spindle in said bushing for rotation therein, a handle, and means for attaching said handle to said spindle for rotation of said spindle which is limited to about 90 degrees, and said handle attaching means comprising a cap sized to be snugly fit over said bushing, hole means in said cap for receiving said spindle, stop means on said cap for limiting movement of said handle to about 90 degrees, and means for aligning said cap with said valve body.

12. A valve comprising a body and means for opening and closing the valve, said valve body having three bore means which are interconnected with each other to allow fluid passage between any two of said bore means, each of said bore means being adapted to operatively receive said valve opening and closing means, said valve opening and closing means comprising a bushing adapted to be sealingly received in any of said bore means, a ball receivable within said valve body and adapted to rotate through about 90 degrees for opening and closing the valve, a spindle, means for attaching a lower portion of said spindle to said ball for rotation thereof, means for sealingly receiving said spindle in said bushing for rotation therein, a handle, and means for attaching said handle to said spindle for rotation of said spindle which is limited to about 90 degrees, and said handle attaching means comprising a cap sized to be snugly fit over said bushing, a projection on said spindle, hole means in said cap for receiving said spindle projection, recess means in said handle for receiving said spindle projection, said hole means having means defining edges which are oriented at right angles to each other for limiting rotational movement of said spindle projection to about 90 degrees, and means for aligning said cap with said valve body.

13. A combination of parts which are interchangeable between a straight valve and an angle valve, the combination comprising a valve body including first and second bore means in fluid communication with each other and having a common axis and further including a third bore means in fluid communication with said first and second bore means and having an axis which is perpendicular to said common axis, means comprising a ball disposable at the intersection of said common and said third bore axes and handle means for rotating said ball for opening and closing the valve, each of said first, second, and third bore means adapted to receive said valve opening and closing means whereby to provide fluid passage between the other two bore means when the valve is open, said valve opening and closing means comprising a bushing adapted to be sealingly received in any of said bore means, said ball adapted to rotate through about 90 degrees for opening and closing the valve, a spindle, means for attaching a lower portion of said spindle to said ball for rotation thereof, means for sealingly receiving said spindle in said bushing for rotation therein, a handle, and means for attaching said handle to said spindle for rotation of said spindle which is limited to about 90 degrees, said handle attaching means comprising a cap sized to be snugly fit over said bushing, hole means in said cap for receiving said spindle, stop means on said cap for limiting movement of said handle to about 90 degrees, and means for aligning said cap with said valve body.

14. A combination of parts which are interchangeable between a straight valve and an angle valve, the combination comprising a valve body including first and second bore means in fluid communication with each other and having a common axis and further including a third bore means in fluid communication with said first and second bore means and having an axis which is perpendicular to said common axis, means comprising a ball disposable at the intersection of said common and said third bore axes and handle means for rotating said ball for opening and closing the valve, each of said first, second, and third bore means adapted to receive said valve opening and closing means whereby to provide fluid passage between the other two bore means when the valve is open, said valve opening and closing means comprising a bushing adapted to be sealingly received in any of said bore means, said ball adapted to rotate through about 90 degrees for opening and closing the valve, a spindle, means for attaching a lower portion of said spindle to said ball for rotation thereof, means for sealingly receiving said spindle in said bushing for rotation therein, a handle, and means for attaching said handle to said spindle for rotation of said spindle which is limited to about 90 degrees, said handle attaching means comprising a cap sized to be snugly fit over said bushing, a projection on said spindle, hole means in said cap for receiving said spindle projection, recess means in said handle for receiving said spindle projection, said hole means having means defining edges which are oriented at right angles to each other for limiting rotational movement of said spindle projection to about 90 degrees, and means for aligning said cap with said valve body.

\* \* \* \* \*